(12) United States Patent
Meng

(10) Patent No.: US 8,976,465 B2
(45) Date of Patent: Mar. 10, 2015

(54) MULTI-RING OPTICAL FILTER ASSEMBLY ALLOWING INDEPENDENT ADJUSTMENT OF ROTATION ANGLE OF EACH LENS THEREOF

(71) Applicant: Tien-Pei Meng, Taipei (TW)

(72) Inventor: Tien-Pei Meng, Taipei (TW)

( * ) Notice: Subject to any disclaimer, the term of this patent is extended or adjusted under 35 U.S.C. 154(b) by 272 days.

(21) Appl. No.: 13/775,316

(22) Filed: Feb. 25, 2013

(65) Prior Publication Data

US 2014/0240854 A1   Aug. 28, 2014

(51) Int. Cl.
*G02B 9/00* (2006.01)
*G02B 5/20* (2006.01)

(52) U.S. Cl.
CPC .......................................... *G02B 5/20* (2013.01)
USPC ........................................................... 359/738

(58) Field of Classification Search
CPC ........................................................ G02B 5/20
USPC ........................ 359/738, 815, 819, 829–830
See application file for complete search history.

(56) References Cited

U.S. PATENT DOCUMENTS

| | | | | |
|---|---|---|---|---|
| 5,381,272 | A | * | 1/1995 | Kato et al. ..................... 359/823 |
| 5,644,441 | A | * | 7/1997 | Hirasaki et al. ............... 359/828 |
| 2007/0171548 | A1 | * | 7/2007 | Kulakofsky et al. .......... 359/808 |

* cited by examiner

*Primary Examiner* — Scott J Sugarman
*Assistant Examiner* — Vipin Patel
(74) *Attorney, Agent, or Firm* — Bacon & Thomas, PLLC

(57) ABSTRACT

The present invention is to provide a multi-ring optical filter assembly, which includes a positioning frame having one end threadedly connected with a front side of a camera lens, a first rotatably connecting frame fixedly provided therein with a first lens (e.g., an ND filter or a polarizer) and provided with a first curved surface adjacent to the other end thereof and extending in an axial direction, an adapter frame provided with a second curved surface adjacent to one end thereof and rotatably connected with the first curved surface, and a second rotatably connecting frame fixedly provided therein with a second lens (e.g., an ND filter or a polarizer) and having one end rotatably connected with the other end of the adapter frame. Thus, the two lenses can be rotated with respect to the camera lens, respectively, for achieving the independent adjustment of the rotation angle of each lens.

14 Claims, 5 Drawing Sheets

MULTI-RING OPTICAL FILTER ASSEMBLY ALLOWING INDEPENDENT ADJUSTMENT OF ROTATION ANGLE OF EACH LENS THEREOF

FIELD OF THE INVENTION

The present invention relates to an optical filter assembly, more particularly to a multi-ring optical filter assembly capable of enabling a user to adjust the angle of a first lens and/or the angle of a second lens thereof with respect to the camera lens, so as to achieve the primary objective of the independent adjustment of the rotation angle of each lens.

BACKGROUND OF THE INVENTION

Thanks to significant developments in digital technologies, digital products not only have been continuously improved in performance and function, but also have been more and more extensively used as their selling prices decline. Nowadays, digital products can be found practically everywhere in our daily lives. Digital still cameras, for example, have the advantageous features of real-time display and digital storage, the latter of which supersedes the traditional photographic films and allows users to more conveniently screen the pictures taken than what is possible with a conventional camera, not to mention the subsequent image processing or sharing that can be done with far greater ease. Because of that, digital still cameras have come to be hot-selling items in the digital consumer product market and have, in recent years, been so popular among consumers that there is almost nobody without one. As the market for digital still cameras rapidly expands, huge business opportunities have emerged for camera accessories.

In order to obtain images with various visual effects, the user of a traditional film-based camera would typically resort to filtering lenses of different effects, such as a soft focus lens, a star filter, a polarizing filter (or better known as polarizer), a neutral density filter (ND filter), and various color filters. Referring to FIG. 1, a filter 21 can be connected to one end of a camera lens 20 and assembled to a camera 30 along with the camera lens 20 so that, when the camera 30 is used to take pictures, images with the desired special effect can be obtained. With the advancement of image processing software, however, the aforementioned filters have been gradually replaced by the powerful digital technologies. But this is not true of polarizers and ND filters. An ND filter is a filter for reducing the passage of light. Generally, ND filters are divided into different sets of specifications according to the percentage of light that is allowed to pass, and one or more ND filters of different specifications can be connected to one camera lens to suit practical needs. Once the amount of light passing through the camera lens is properly reduced, pictures can be taken where there is a strong light source, or special photographic techniques (e.g., swinging a black board in front of a camera to achieve uniform exposure in a high contrast environment) can be applied. A polarizer, on the other hand, is a filter based on the principle of polarization of light and has grate-like crystals arranged in a parallel manner. By rotating a polarizer, the angle of its grate-like crystals can be adjusted to regulate the passage of light having a specific polarization angle. Once connected to a camera lens and rotated to an appropriate angle, a polarizer can effectively eliminate surface reflections from the object being photographed (e.g., a water surface, a glass cabinet, or the surface of a leaf of a plant) and thereby produce the desired photographic effect.

As an ND filter of specific specifications corresponds to a specific percentage of light passage, a consumer must buy and carry ND filters of different specifications and choose whichever is suitable for the light intensity of the photographing environment. However, not only is the purchase of plural ND filters costly, but also it is very inconvenient having to carry all the ND filters around. Moreover, the need to frequently mount and dismount the ND filters complicates camera operation. While the conventional polarizers are also capable of reducing the passage of light to some extent, they are, after all, not designed specifically for that purpose and therefore cannot be used in place of ND filters. Besides, it is not uncommon that a polarizer has to be used in conjunction with ND filters of different specifications in order to photograph at different ambient light intensities.

To solve the aforementioned drawbacks of the prior art, an optical filter assembly known as an "adjustable ND filter" was developed and sold in the market. The adjustable ND filter includes two circular frames which are rotatable relative to each other and are each provided therein with a lens. When the circular frames are rotated relative to each other, the lenses are rotated relative to each other, too. In an embodiment of the adjustable ND filter, each of the lenses is a polarizer. By rotating each circular frame, the polarization angle of the corresponding polarizer can be adjusted to change the included angle between the polarization angles of the two polarizers, thereby regulating the percentage of incident light that is allowed to pass. Products employing the aforesaid technical solutions grabbed photography aficionados' attention and received positive feedbacks immediately after they hit the market, but the inventor was not satisfied and, despite the fact that the "adjustable ND filter" is greatly improved in terms of convenience and utility as compared with the traditional filters, sought to make further improvements to benefit photography enthusiasts. By using the adjustable ND filter personally and consistently and exchanging experiences with other photographers, the inventor has found that, although the adjustable ND filter allows its user to freely adjust the passing percentage of incident light and can filter out certain polarized light as can a polarizer, a user sometimes still feels the need to use only one of the functions (e.g., the function of a polarizer to eliminate reflections) or use one of the filters in combination with another lens (e.g., a protective lens). Since the two circular frames of the "adjustable ND filter" are not configured to be disassembled and reassembled at will, a user wishing to use only one of the functions of the adjustable ND filter tends to remove the entire adjustable ND filter from a camera lens and mount a traditional polarizer to the camera lens instead. That is to say, the design of the "adjustable ND filter" lacks variability and flexibility in the use of its lenses and hence still leaves room for betterment.

According to the above, the traditional filters are disadvantageous with regard to purchase costs, portability, and convenience of use. While the inventor has successfully developed an optical filter assembly known as the "adjustable ND filter" which features far more ease of use and significantly higher practicality than the traditional filters, this optical filter assembly is not perfect yet. The issue to be addressed by the present invention, therefore, is to design an optical filter assembly which not only maintains the convenience and usefulness of the "adjustable ND filter", but also allows the lenses in the optical filter assembly to be flexibly used in various combinations.

BRIEF SUMMARY OF THE INVENTION

In view of the fact that the conventional filters have such drawbacks as being costly, difficult to carry, and inconvenient to use, and that the "adjustable ND filter" developed by the inventor of the present invention to overcome the drawbacks of the traditional filters does not provide sufficient variability and flexibility in lens combinations, the inventor, in the spirit of pursuing perfection, made further designs and improvements by putting into practice his ample experience as a professional photographer and applying the knowledge obtained from working persistently in the related industries. Finally, a multi-ring optical filter assembly allowing independent adjustment of the rotation angle of each lens thereof was successfully developed. The present invention is intended to provide photography enthusiasts with a more convenient and more useful optical filter assembly which not only solves all the aforementioned problems of the conventional filters, but also is effectively enhanced in the variability and flexibility of lens combinations while maintaining the ease of use and practicality of the aforesaid "adjustable ND filter".

The primary object of the present invention is to provide a multi-ring optical filter assembly allowing independent adjustment of the rotation angle of each lens thereof. The optical filter assembly includes a positioning frame, a first rotatably connecting frame, an adapter frame, and a second rotatably connecting frame. The positioning frame is a hollow circular frame. A positioning ring is provided at one end of the positioning frame and protrudes in an axial direction of the positioning frame. The outer periphery of the positioning ring is provided with threads to be threadedly connected with threads on the front side of a camera lens so as to position the positioning frame on the front side of the camera lens. The other end of the positioning frame has an inner periphery provided with a first rotatably connecting groove. The first rotatably connecting frame is a hollow circular frame. A first rotatably connecting ring is provided at one end of the first rotatably connecting frame and protrudes in an axial direction of the first rotatably connecting frame. The outer periphery of the first rotatably connecting ring is provided with a first rotatably connecting flange. The first rotatably connecting flange and the first rotatably connecting groove can engage, and rotatably connect, with each other thanks to the elasticity and deformability of the first rotatably connecting frame and of the positioning frame. The first rotatably connecting frame is fixedly provided therein with a first lens (e.g., an ND filter or a polarizer) corresponding in position to the hollow portion of the first rotatably connecting frame. The first lens can be rotated with the first rotatably connecting frame relative to the camera lens. The first rotatably connecting frame is further provided with a first curved surface which is adjacent to the other end of the first rotatably connecting frame and which extends in the axial direction of the first rotatably connecting frame. The adapter frame is a hollow circular frame. A second curved surface is provided on the adapter frame, is adjacent to one end thereof (hereinafter referred to as the first end of the adapter frame), and extends in an axial direction of the adapter frame. The second curved surface and the first curved surface can engage, and rotatably connect, with each other thanks to the elasticity and deformability of the adapter frame and of the first rotatably connecting frame, so as for the first rotatably connecting frame to rotate with the adapter frame or for the adapter frame to rotate relative to the first rotatably connecting frame. The other end of the adapter frame has an inner periphery provided with a second rotatably connecting groove. The second rotatably connecting frame is a hollow circular frame. A second rotatably connecting ring is provided at one end of the second rotatably connecting frame and protrudes in an axial direction of the second rotatably connecting frame. The outer periphery of the second rotatably connecting ring is provided with a second rotatably connecting flange. The second rotatably connecting flange and the second rotatably connecting groove can engage, and rotatably connect, with each other thanks to the elasticity and deformability of the second rotatably connecting frame and of the adapter frame. The second rotatably connecting frame is fixedly provided therein with a second lens (e.g., an ND filter or a polarizer) corresponding in position to the hollow portion of the second rotatably connecting frame. The second lens can be rotated with the second rotatably connecting frame relative to the adapter frame.

To use the multi-ring optical filter assembly of the present invention, the user only has to adjust the angle of the first lens and/or of the second lens with respect to the camera lens, and countless filtering effects can be achieved to meet the needs of different photographing environments. Further, as the first rotatably connecting flange and the first rotatably connecting groove (or the second rotatably connecting flange and the second rotatably connecting groove) of the present invention are engaged, and rotatably connected, with each other through elasticity and deformability of the frames, friction is bound to exist between each pair of the rotatably connected flange and groove. Therefore, once any of the lenses is independently adjusted to the desired angle, the lens is unlikely to move away from the desired angle when the camera is shaken. In other words, each lens is so arranged as to provide a stable filtering effect in addition to enhanced convenience of use.

Another object of the present invention is to provide the foregoing multi-ring optical filter assembly, wherein the rotatably connected area between the first curved surface and the second curved surface is greater than the rotatably connected area between the first rotatably connecting flange and the first rotatably connecting groove. Thus, depending on the force applied by the user, the adapter frame may be elastically deformed to a relatively small or relatively large extent to rotate only the second rotatably connecting frame or rotate the first and the second rotatably connecting frames simultaneously. Or, the first lens and the second lens can be rapidly adjusted through a combination of the aforesaid adjusting actions to angles conducive to the desired filtering effect.

Still another object of the present invention is to provide the foregoing multi-ring optical filter assembly, wherein the first end of the adapter frame is formed with a plurality of slots which extend in the axial direction of the adapter frame and which are distributed along a circumferential direction of the adapter frame at positions corresponding to the second curved surface. The slots serve to increase elastic deformation of the first end of the adapter frame, allowing the adapter frame to be easily connected to or detached from the first rotatably connecting frame.

Yet another object of the present invention is to provide the foregoing multi-ring optical filter assembly, wherein the inner diameter of the second rotatably connecting frame is greater than the inner diameter of the first rotatably connecting frame, and wherein the diameter of the second lens is greater than that of the first lens. The dimensional relationships stated above are such that the optical filter assembly can be mounted to and used with a wide-angle lens without causing dark corners in images captured with the wide-angle lens.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
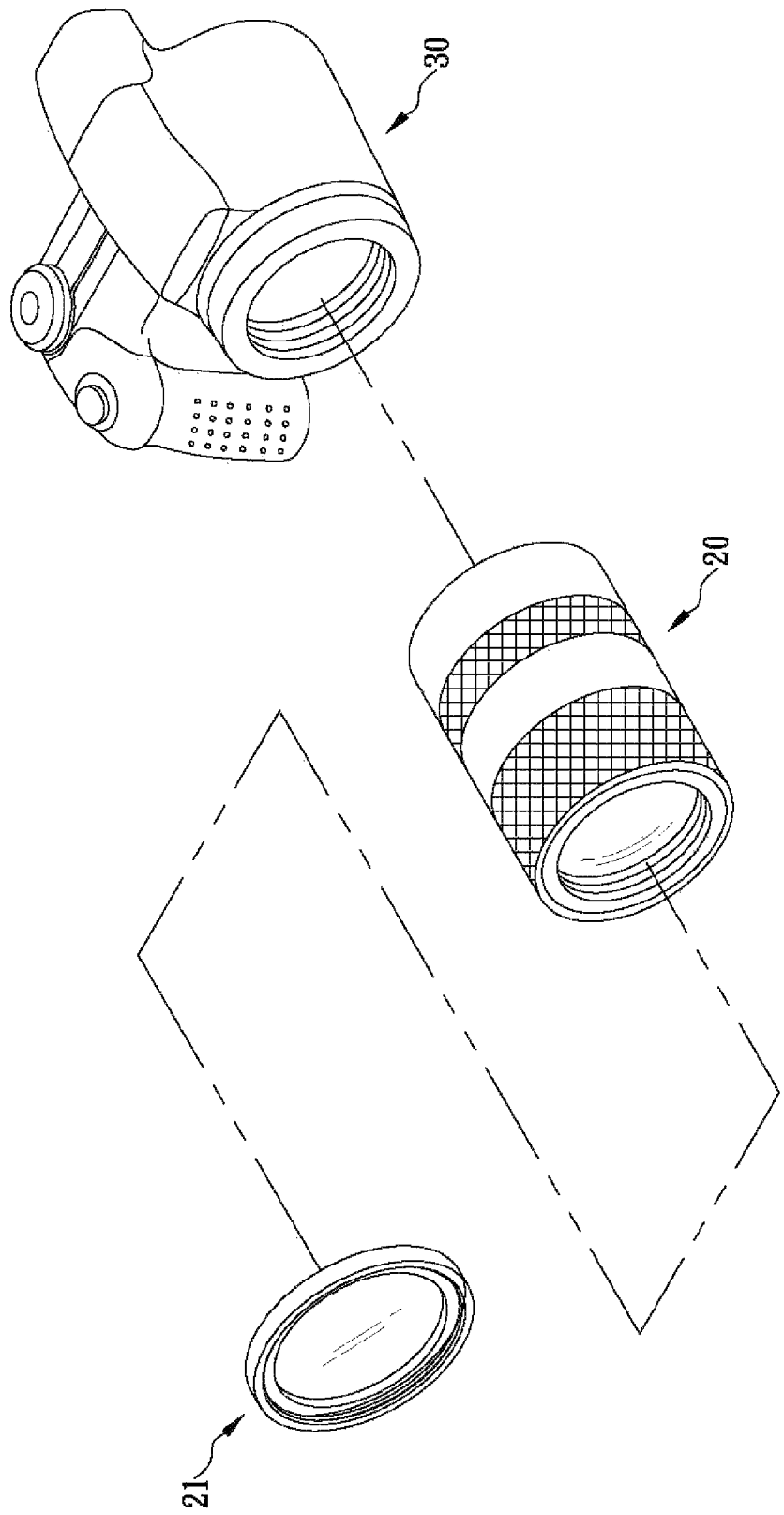
FIG. 1 is an exploded perspective view showing how a conventional filter is applied to a camera.
Figure 2:
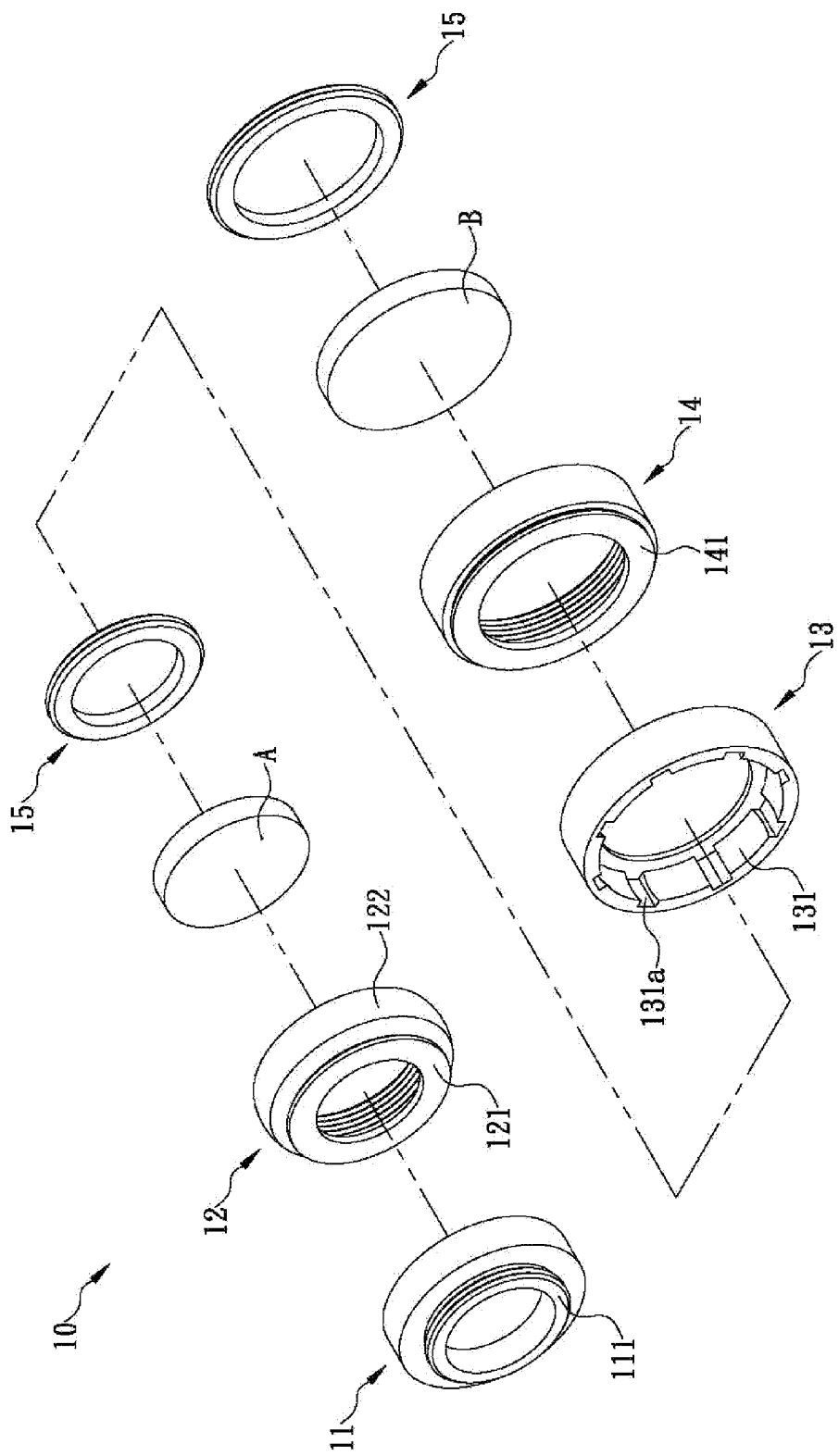
FIG. 2 is an exploded perspective view of the first preferred embodiment of the present invention.
Figure 3:
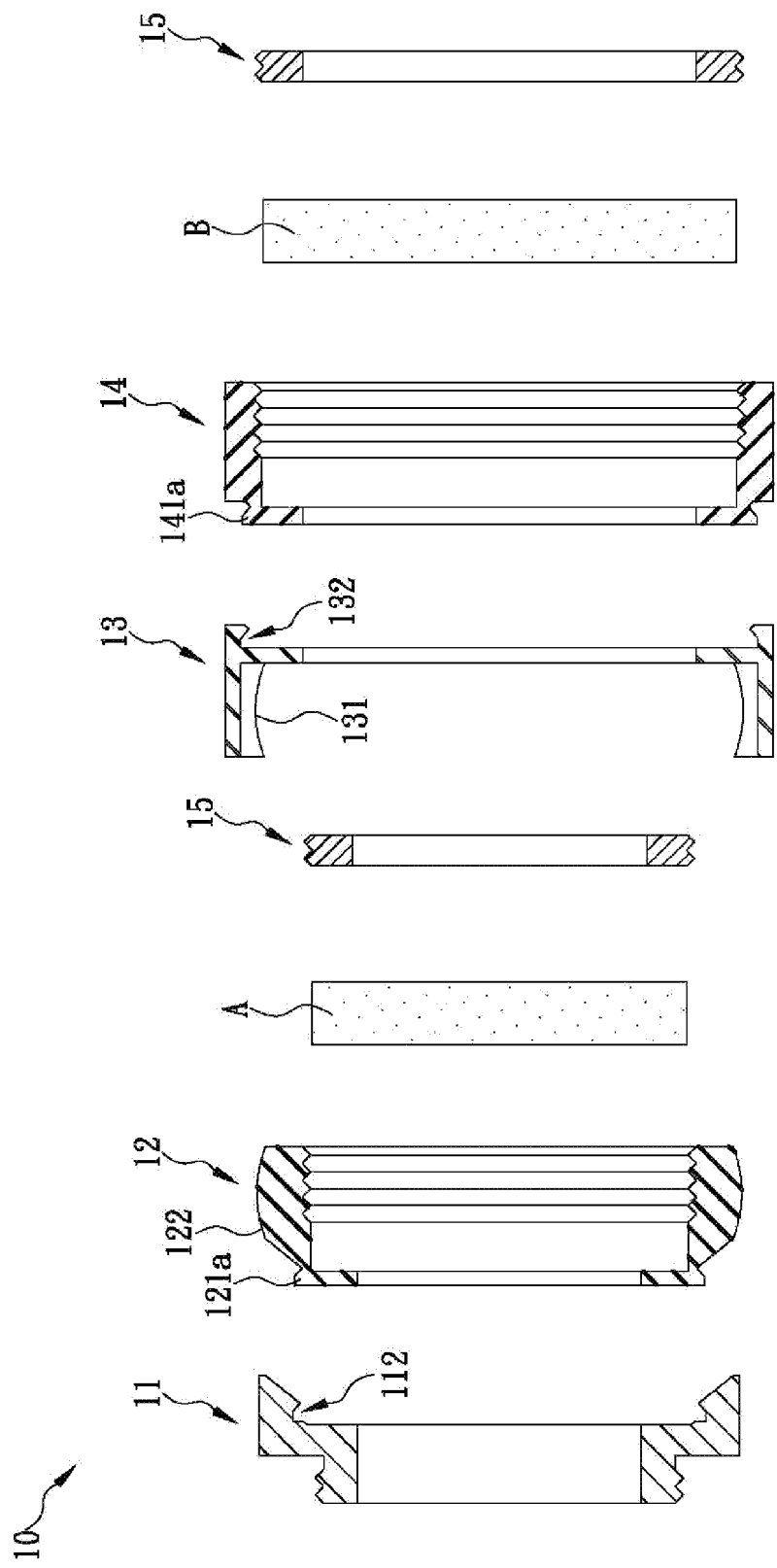
FIG. 3 is an exploded sectional view of the first preferred embodiment of the present invention.

The present invention discloses a multi-ring optical filter assembly allowing independent adjustment of the rotation angle of each lens thereof. Referring to FIG. 2 and FIG. 3, the optical filter assembly 10 is applicable to a camera lens 20 (see FIG. 1) and can be mounted to a camera 30 (see FIG. 1) along with the camera lens 20. In the first preferred embodiment of the present invention, the optical filter assembly 10 includes a positioning frame 11, a first rotatably connecting frame 12, an adapter frame 13, and a second rotatably connecting frame 14. The frames 11~14 may be made of metal, fiber-reinforced plastic, or plastic. The positioning frame 11 is a hollow circular frame. One end of the positioning frame 11 is provided with a positioning ring 111 which protrudes in an axial direction of the positioning frame 11. The other end of the positioning frame 11 has an inner periphery provided with a first rotatably connecting groove 112. The outer periphery of the positioning ring 111 is provided with threads. The threads of the positioning ring 111 can be threadedly connected with threads provided on the front side of the camera lens 20, so as to position the positioning frame 11 on the front side of the camera lens 20. The first rotatably connecting frame 12 is a hollow circular frame and is fixedly provided therein with a first lens A corresponding in position to the hollow portion of the first rotatably connecting frame 12. One end of the first rotatably connecting frame 12 is provided with a first rotatably connecting ring 121 which protrudes in an axial direction of the first rotatably connecting frame 12. A first curved surface 122 is provided on an outer periphery of the first rotatably connecting frame 12, wherein the outer periphery is adjacent to the other end of the first rotatably connecting frame 12 and is not to be rotatably connected with the positioning frame 11. The first curved surface 122 extends in the axial direction of the first rotatably connecting frame 12. The outer periphery of the first rotatably connecting ring 121 is provided with a first rotatably connecting flange 121a. The first rotatably connecting flange 121a is engageable with the first rotatably connecting groove 112 so that the first rotatably connecting frame 12 is rotatably connected with the positioning frame 11 and can rotate relative to the positioning frame 11 and the camera lens 20, causing the first lens A to rotate with the first rotatably connecting frame 12 relative to the camera lens 20.

The adapter frame 13 is a hollow circular frame. The adapter frame 13 has an inner periphery which is adjacent to one end of the adapter frame 13 (hereinafter referred to as the first end of the adapter frame 13) and provided with a second curved surface 131. The second curved surface 131 extends in an axial direction of the adapter frame 13. The other end of the adapter frame 13 has an inner periphery provided with a second rotatably connecting groove 132. The second curved surface 131 is engageable with the first curved surface 122 so that the adapter frame 13 is detachably connected to the first rotatably connecting frame 12. In the first preferred embodiment of the present invention, the rotatably connected area between the first curved surface 122 and the second curved surface 131 is greater than the rotatably connected area between the first rotatably connecting flange 121a and the first rotatably connecting groove 112. This ensures that friction between the adapter frame 13 and the first rotatably connecting frame 12 is greater than friction between the positioning frame 11 and the first rotatably connecting frame 12. Hence, when a user applies a force to the adapter frame 13 to rotate it, the adapter frame 13 drives the first rotatably connecting frame 12 by friction. As a result, both the first rotatably connecting frame 12 and the first lens A are rotated relative to the positioning frame 11, which is fixed to the camera lens 20 shown in FIG. 1. In the first preferred embodiment, the second curved surface 131 presses tightly against the first curved surface 122 due to the elasticity and deformability of the adapter frame 13 and of the first rotatably connecting frame 12. This arrangement effectively increases friction between the adapter frame 13 and the first rotatably connecting frame 12 and thereby increases the ease with which a user can rotate the first rotatably connecting frame 12 by the adapter frame 13.

Reference is now made to FIG. 2. As stated above, with the second curved surface 131 pressing tightly against the first curved surface 122, the adapter frame 13 is enabled to drive the first rotatably connecting frame 12 into simultaneous rotation with the adapter frame 13. It should be noted, however, that friction between the first curved surface 122 and the second curved surface 131 influences not only the ease with which a user can rotate the first rotatably connecting frame 12 via the adapter frame 13, but also the ease with which the adapter frame 13 can be connected to or detached from the first rotatably connecting frame 12. If the friction between the first curved surface 122 and the second curved surface 131 is too high, installation or removal of the adapter frame 13 could be a problem. In order to prevent such a problem, the first preferred embodiment is so designed that the first end of the adapter frame 13 is formed with a plurality of slots 131a. The slots 131a extend in the axial direction of the adapter frame 13 and are distributed along a circumferential direction of the adapter frame 13 at positions corresponding to the second curved surface 131. By changing the number and arrangement of the slots 131a, the rotatably connected area between the first curved surface 122 and the second curved surface 131 can be properly adjusted to precisely control the friction between the two curved surfaces, allowing a user to install or detach the adapter frame 13 to or from the first rotatably connecting frame 12 as easily as the user can rotate the first rotatably connecting frame 12 via the adapter frame 13.

It should be pointed out that the slots 131a are not necessarily formed at the first end of the adapter frame 13. In other preferred embodiments of the present invention, the slots 131a may alternatively be formed on the first rotatably connecting frame 12 at positions corresponding to the first curved surface 122 or be formed on both the adapter frame 13 and the first rotatably connecting frame 12. The number and arrangement of the slots 131a are adjustable as required to produce different effects. For example, it is feasible to design both the first curved surface 122 and the second curved surface 131 as wavy surfaces such that both curved surfaces are circumferentially provided with gear-like structures, wherein the sunken portions of the wavy surfaces are equivalent to the slots 131a. In this wavy-surface configuration, the second curved surface 131 need not press tightly against the first curved surface 122. As long as the protruding portions of the wavy first curved surface 122 can press against the protruding portions of the wavy second curved surface 131 when the adapter frame 13 is rotated, a user can easily rotate the first rotatably connecting frame 12 by means of the adapter frame 13. Also, one who wishes to install or detach the adapter frame 13 to or from the first rotatably connecting frame 12 only has to turn the adapter frame 13 slightly such that the protruding portions of one of the wavy surfaces (i.e., the first curved surface 122 or the second curved surface 131) correspond in position to the sunken portions of the opposite wavy surface (i.e., the second curved surface 131 or the first curved surface 122), and the adapter frame 13 can be readily installed or detached to or from the first rotatably connecting frame 12.

Referring again to FIG. 3, the second rotatably connecting frame 14 is a hollow circular frame and is fixedly provided therein with a second lens B which corresponds in position to the hollow portion of the second rotatably connecting frame 14. It should be pointed out that, in the first preferred embodiment, the first lens A and the second lens B are fixed to the first rotatably connecting frame 12 and the second rotatably connecting frame 14 by two fixing frames 15 respectively. However, the present invention is not limited to this arrangement; the first lens A and the second lens B may be respectively fixed to the first rotatably connecting frame 12 and the second rotatably connecting frame 14 otherwise. One end of the second rotatably connecting frame 14 is provided with a second rotatably connecting ring 141 which protrudes in an axial direction of the second rotatably connecting frame 14 (see FIG. 2). The outer periphery of the second rotatably connecting ring 141 is provided with a second rotatably connecting flange 141a. The second rotatably connecting flange 141a is engageable with the second rotatably connecting groove 132 so that the second rotatably connecting frame 14 is rotatably connected with the adapter frame 13 and can rotate relative to the adapter frame 13, causing the second lens B to rotate with the second rotatably connecting frame 14 relative to the adapter frame 13.

Figure 4:
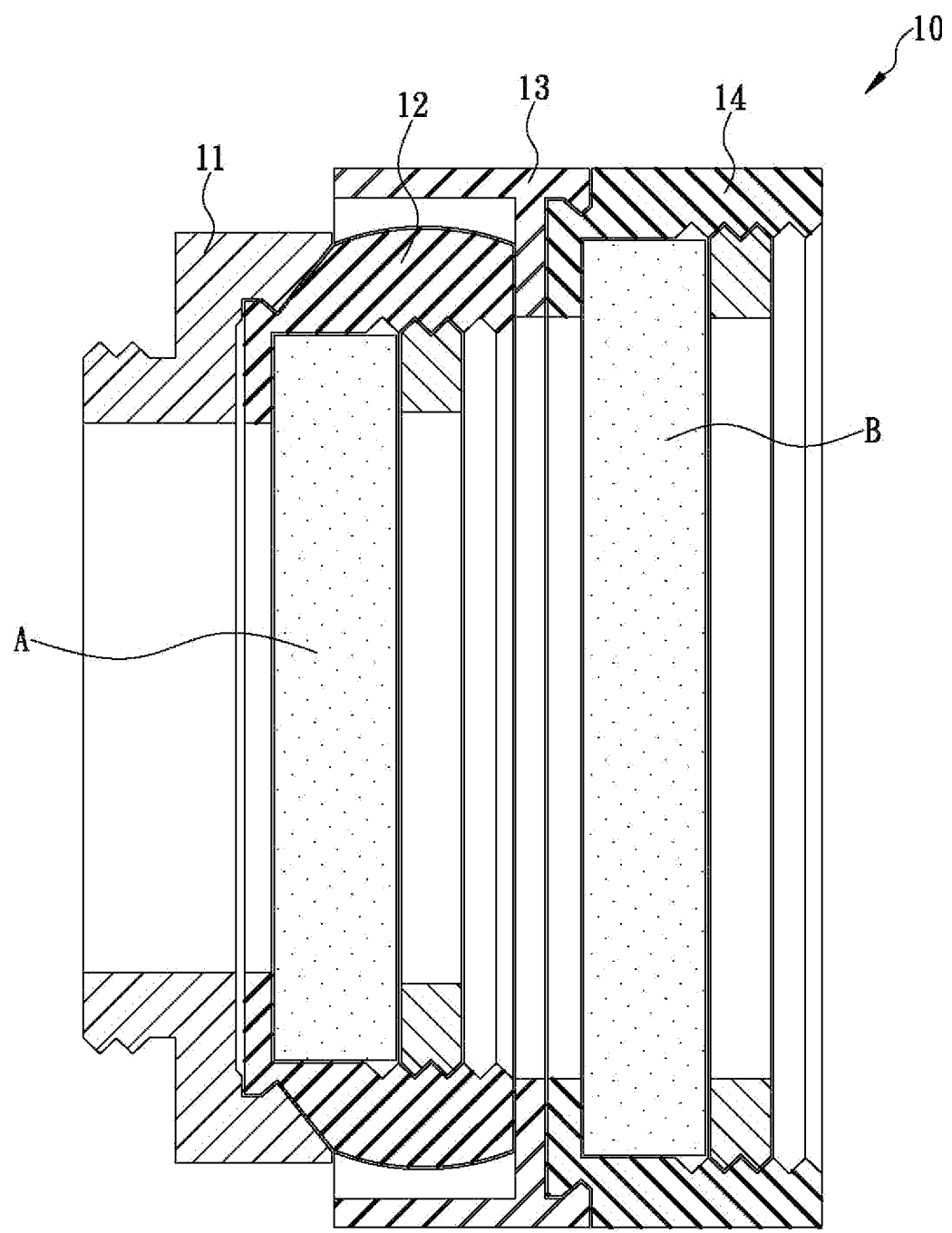
FIG. 4 is an assembled sectional view of the first preferred embodiment of the present invention.

Referring to FIG. 4, it can be known from the above that, when it is desired to adjust the angle of only the second lens B, the user can hold the adapter frame 13 single-handedly and operate the second rotatably connecting frame 14 with the other hand. Thus, the second lens B can be rotated without rotating the first lens A. When it is desired to rotate both the first lens A and the second lens B and thereby simultaneously adjust the angles thereof with respect to the camera lens 20 (see FIG. 1), the user can turn the adapter frame 13 and the second rotatably connecting frame 14 at the same time so that not only is the second rotatably connecting frame 14 directly driven to rotate, but also the first rotatably connecting frame 12 is indirectly driven to rotate by the adapter frame 13. Thus, adjustment is made to the angle of the first lens A and of the second lens B at the same time. It should be pointed out that a manufacturer wishing to manufacture the optical filter assembly 10 according to the present invention may modify the design of the adapter frame 13 and of the second rotatably connecting frame 14 in such a way that a certain amount of friction remains between the adapter frame 13 and the second rotatably connecting frame 14. In that case, a user only has to turn the adapter frame 13, and the adapter frame 13 will drive the second rotatably connecting frame 14, as well as the first rotatably connecting frame 12, into rotation, thanks to the friction between the adapter frame 13 and the first rotatably connecting frame 12 and the friction between the adapter frame 13 and the second rotatably connecting frame 14, allowing the first lens A and the second lens B to be simultaneously adjusted in angle with respect to the camera lens 20. Further, as the adapter frame 13 is detachably connected to the first rotatably connecting frame 12, when it is desired to use only the first lens A or use the first lens A in conjunction with another lens (not shown), the user can remove the second rotatably connecting frame 14 from the first rotatably connecting frame 12 along with the adapter frame 13, so the first lens A can be used alone or in combination with another lens which is provided in another frame (not shown) connectable to the first rotatably connecting frame 12.

Figure 5:
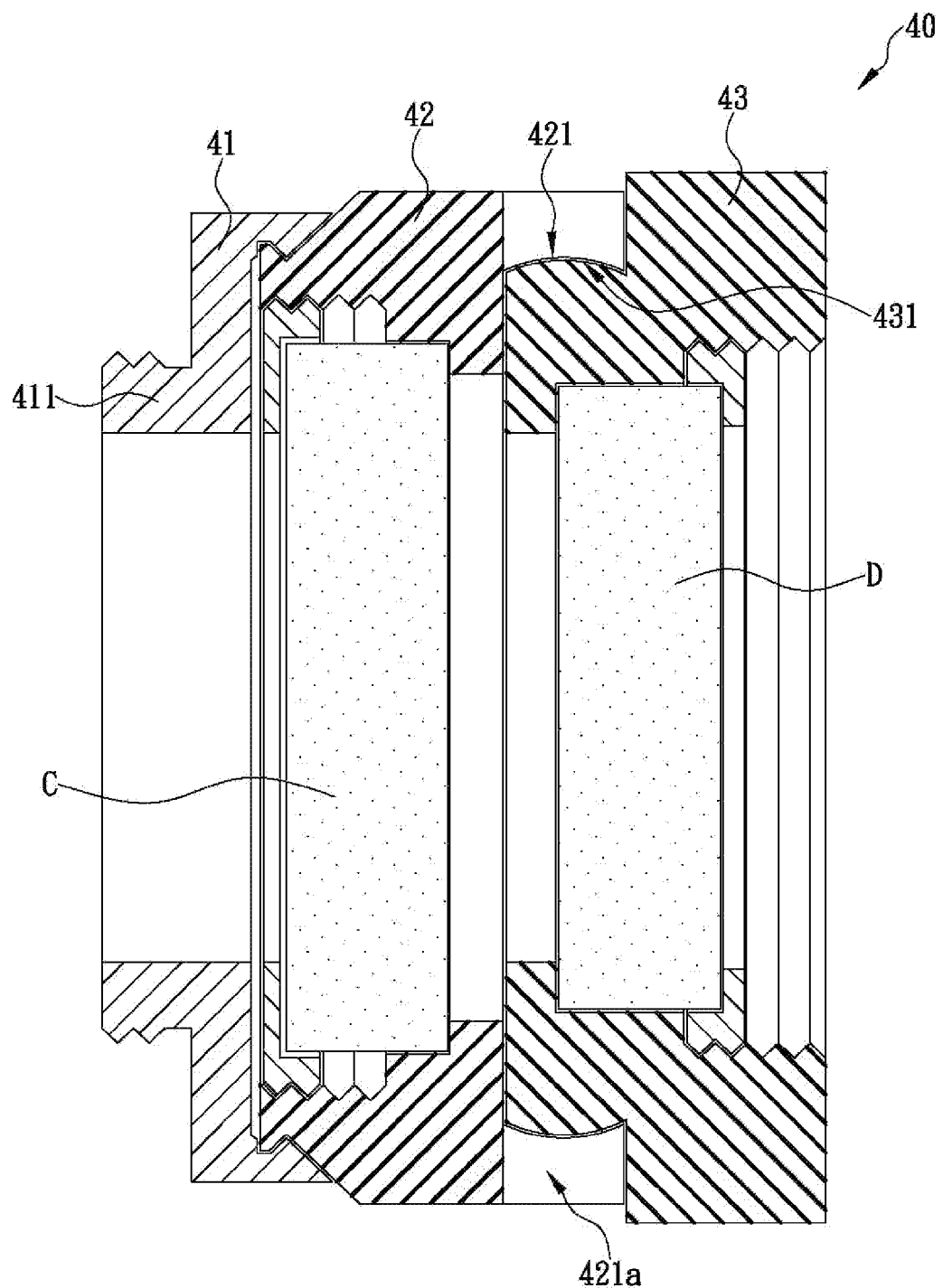
FIG. 5 is an assembled sectional view of the second preferred embodiment of the present invention.

The present invention can be implemented in ways other than illustrated by the first preferred embodiment described above. In the second preferred embodiment of the present invention as shown in FIG. 5, the optical filter assembly 40 includes a positioning frame 41, a first rotatably connecting frame 42, and a second rotatably connecting frame 43. The frames 41~43 are all hollow circular frames. One end of the positioning frame 41 is provided with a positioning ring 411 which protrudes in an axial direction of the positioning frame 41. The outer periphery of the positioning ring 411 is provided with threads so as for the positioning frame 41 to connect threadedly with a camera lens 20 (see FIG. 1). The first rotatably connecting frame 42 is fixedly provided therein with a first lens C which corresponds in position to the hollow portion of the first rotatably connecting frame 42. The first rotatably connecting frame 42 is rotatably connected to the positioning frame 41 and can rotate relative to the positioning frame 41 and the camera lens 20, causing the first lens C to rotate with the first rotatably connecting frame 42 relative to the camera lens 20. A first curved surface 421 is provided on an inner periphery of the first rotatably connecting frame 42, wherein the inner periphery is adjacent to the end of the first rotatably connecting frame 42 that faces away from the positioning frame 41 and the first curved surface 421 extends in an axial direction of the first rotatably connecting frame 42. A second curved surface 431 is provided on an outer periphery of the second rotatably connecting frame 43, wherein the outer periphery is adjacent to one end of the second rotatably connecting frame 43 and the second curved surface 431 extends in an axial direction of the second rotatably connecting frame 43. The first curved surface 421 is engageable with the second curved surface 431 so that the first rotatably connecting frame 42 is rotatably connected to and can rotate relative to the second rotatably connecting frame 43. The second rotatably connecting frame 43 is fixedly provided therein with a second lens D corresponding in position to the hollow portion of the second rotatably connecting frame 43. When the second rotatably connecting frame 43 is rotated relative to the first rotatably connecting frame 42, the angle of the second lens D is changed with respect to the first lens C. Therefore, when it is desired to adjust the angle of only the second lens D, the user can hold the first rotatably connecting frame 42 with one hand and operate the second rotatably connecting frame 43 with the other hand. When it is desired to rotate the first lens C and the second lens D simultaneously, the user can directly turn the first rotatably connecting frame 42 (or turn the first rotatably connecting frame 42 and the second rotatably connecting frame 43 at the same time) in order to make simultaneous angular adjustment to the first lens C and the second lens D. Moreover, the detachable connection between the second rotatably connecting frame 43 and the first rotatably connecting frame 42 effectively enables a variety of lens combinations.

In the second preferred embodiment of the present invention, the first rotatably connecting frame 42 is provided with a plurality of slots 421a which extend through the first rotatably connecting frame 42; in other words, the slots 421a not only correspond in position to the first curved surface 421, but also extend to the outer periphery of the first rotatably connecting frame 42. This configuration significantly increases elastic deformability of the first rotatably connecting frame 42, allowing the design of the first rotatably connecting frame 42 and of the second rotatably connecting frame 43 to be modified in such a way that the outer diameter of the first curved surface 421 is slightly greater than the inner diameter of the second curved surface 431. Thus, when the second rotatably connecting frame 43 is connected to the first rotatably connecting frame 42, a tight connection can be effectively achieved therebetween to increase the friction therebetween. In addition, with the first rotatably connecting frame 42 having high elastic deformability, installation and detachment of the second rotatably connecting frame 43 are made easy.

Referring back to FIG. 2, in the first preferred embodiment of the present invention, the inner diameter of the second rotatably connecting frame 14 is greater than the inner diameter of the first rotatably connecting frame 12, and the diameter of the second lens B is greater than that of the first lens A. The dimensional relationships stated above render the optical filter assembly 10 suitable for use with a wide-angle lens (not shown) and prevent the optical filter assembly 10 from producing dark corners in images taken with the wide-angle lens.

While the invention herein disclosed has been described by means of specific embodiments, numerous modifications and variations could be made thereto by those skilled in the art without departing from the scope of the invention set forth in the claims.

What is claimed is:

1. A multi-ring optical filter assembly allowing independent adjustment of a rotation angle of each lens thereof, comprising:
    a positioning frame formed as a hollow circular frame, the positioning frame having an end provided with a positioning ring protruding in an axial direction of the positioning frame, the positioning ring having an outer periphery provided with threads threadedly connectable with threads provided on a front side of a camera lens, so as to position the positioning frame on the front side of the camera lens, the positioning frame having an opposite end having an inner periphery provided with a first rotatably connecting groove;
    a first rotatably connecting frame formed as a hollow circular frame, the first rotatably connecting frame having a first end provided with a first rotatably connecting ring protruding in an axial direction of the first rotatably connecting frame, the first rotatably connecting ring having an outer periphery provided with a first rotatably connecting flange, wherein the first rotatably connecting flange and the first rotatably connecting groove are engageable, and rotatably connectable, with each other due to elasticity and deformability of the first rotatably connecting frame and of the positioning frame, the first rotatably connecting frame being fixedly provided therein with a first lens corresponding in position to a hollow portion of the first rotatably connecting frame, the first lens being rotatable with the first rotatably connecting frame relative to the camera lens, the first rotatably connecting frame having an outer periphery which is adjacent to an opposite second end of the first rotatably connecting frame, is not configured for rotatable connection with the positioning frame, and is provided with a first curved surface extending in the axial direction of the first rotatably connecting frame;
    an adapter frame formed as a hollow circular frame, the adapter frame having an inner periphery which is adjacent to a first end of the adapter frame and is provided with a second curved surface extending in an axial direction of the adapter frame, wherein the second curved surface and the first curve surface are engageable, and rotatably connectable, with each other due to elasticity and deformability of the adapter frame and of the first rotatably connecting frame, so as for the first rotatably connecting frame to rotate with the adapter frame or for the adapter frame to rotate relative to the first rotatably connecting frame, the adapter frame having another inner periphery which is located at an opposite second end of the adapter frame and is provided with a second rotatably connecting groove; and
    a second rotatably connecting frame formed as a hollow circular frame, the second rotatably connecting frame having an end provided with a second rotatably connecting ring protruding in an axial direction of the second rotatably connecting frame, the second rotatably connecting ring having an outer periphery provided with a second rotatably connecting flange, wherein the second rotatably connecting flange and the second rotatably connecting groove are engageable, and rotatably connectable, with each other due to elasticity and deformability of the second rotatably connecting frame and of the adapter frame, the second rotatably connecting frame being fixedly provided therein with a second lens, the second lens being rotatable with the second rotatably connecting frame relative to the adapter frame.

2. The multi-ring optical filter assembly of claim 1, wherein a rotatably connected area between the first curved surface and the second curved surface is greater than a rotatably connected area between the first rotatably connecting flange and the first rotatably connecting groove.

3. The multi-ring optical filter assembly of claim 2, wherein the first rotatably connecting frame is formed with a plurality of slots adjacent to the second end of the first rotatably connecting frame, the slots extending in the axial direction of the first rotatably connecting frame, being distributed along a circumferential direction of the first rotatably connecting frame, and corresponding in position to the first curved surface.

4. The multi-ring optical filter assembly of claim 2, wherein the first end of the adapter frame is formed with a plurality of slots, the slots extending in the axial direction of the adapter frame, being distributed along a circumferential direction of the adapter frame, and corresponding in position to the second curved surface.

5. The multi-ring optical filter assembly of claim 1, wherein the second rotatably connecting frame has an inner diameter greater than an inner diameter of the first rotatably connecting frame, and the second lens is greater in diameter than the first lens.

6. The multi-ring optical filter assembly of claim 2, wherein the second rotatably connecting frame has an inner diameter greater than an inner diameter of the first rotatably connecting frame, and the second lens is greater in diameter than the first lens.

7. The multi-ring optical filter assembly of claim 3, wherein the second rotatably connecting frame has an inner diameter greater than an inner diameter of the first rotatably connecting frame, and the second lens is greater in diameter than the first lens.

8. The multi-ring optical filter assembly of claim 4, wherein the second rotatably connecting frame has an inner diameter greater than an inner diameter of the first rotatably connecting frame, and the second lens is greater in diameter than the first lens.

9. A multi-ring optical filter assembly allowing independent adjustment of a rotation angle of each lens thereof, comprising:

a positioning frame formed as a hollow circular frame, the positioning frame having an end provided with a positioning ring protruding in an axial direction of the positioning frame, the positioning ring having an outer periphery provided with threads threadedly connectable with threads provided on a front side of a camera lens, so as to position the positioning frame on the front side of the camera lens, the positioning frame having an opposite end having an inner periphery provided with a first rotatably connecting groove;

a first rotatably connecting frame formed as a hollow circular frame, the first rotatably connecting frame having a first end provided with a first rotatably connecting ring protruding in an axial direction of the first rotatably connecting frame, the first rotatably connecting ring having an outer periphery provided with a first rotatably connecting flange, wherein the first rotatably connecting flange and the first rotatably connecting groove are engageable, and rotatably connectable, with each other due to elasticity and deformability of the first rotatably connecting frame and of the positioning frame, the first rotatably connecting frame being fixedly provided therein with a first lens corresponding in position to a hollow portion of the first rotatably connecting frame, the first lens being rotatable with the first rotatably connecting frame relative to the camera lens, the first rotatably connecting frame being provided with a first curved surface which is adjacent to an opposite second end of the first rotatably connecting frame and extends in the axial direction of the first rotatably connecting frame; and a second rotatably connecting frame formed as a hollow circular frame, the second rotatably connecting frame being provided with a second curved surface which is adjacent to an end of the second rotatably connecting frame and extends in an axial direction of the second rotatably connecting frame, wherein the second curved surface and the first curved surface are engageable, and rotatably connectable, with each other due to elasticity and deformability of the second rotatably connecting frame and of the first rotatably connecting frame, the second rotatably connecting frame being fixedly provided therein with a second lens, the second lens being rotatable with the second rotatably connecting frame relative to the first rotatably connecting frame.

10. The multi-ring optical filter assembly of claim 9 wherein the first rotatably connecting frame is formed with a plurality of slots adjacent to the second end of the first rotatably connecting frame, the slots extending in the axial direction of the first rotatably connecting frame, being distributed along a circumferential direction of the first rotatably connecting frame, and corresponding in position to the first curved surface.

11. The multi-ring optical filter assembly of claim 9, wherein the end of the second rotatably connecting frame is formed with a plurality of slots, the slots extending in the axial direction of the second rotatably connecting frame, being distributed along a circumferential direction of the second rotatably connecting frame, and corresponding in position to the second curved surface.

12. The multi-ring optical filter assembly of claim 9, wherein the second rotatably connecting frame has an inner diameter greater than an inner diameter of the first rotatably connecting frame, and the second lens is greater in diameter than the first lens.

13. The multi-ring optical filter assembly of claim 10, wherein the second rotatably connecting frame has an inner diameter greater than an inner diameter of the first rotatably connecting frame, and the second lens is greater in diameter than the first lens.

14. The multi-ring optical filter assembly of claim 11, wherein the second rotatably connecting frame has an inner diameter greater than an inner diameter of the first rotatably connecting frame, and the second lens is greater in diameter than the first lens.

* * * * *